US007319983B2

(12) United States Patent
Colabella et al.

(10) Patent No.: US 7,319,983 B2
(45) Date of Patent: Jan. 15, 2008

(54) ACCOUNT STATUS SYSTEM AND METHOD FOR MANAGING A CLOSING OF A USER ACCOUNT

(75) Inventors: Christina E. Colabella, Richmond, VA (US); Timothy Roland Delfausse, Richmond, VA (US); Harold Reed Ogrosky, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 814 days.

(21) Appl. No.: 09/911,123

(22) Filed: Jul. 23, 2001

(65) Prior Publication Data
US 2003/0018552 A1    Jan. 23, 2003

(51) Int. Cl.
*G06F 17/60* (2006.01)
(52) U.S. Cl. .............................. 705/35; 705/41; 705/39; 235/380

(58) Field of Classification Search .................. 705/35, 705/41, 39; 235/380
See application file for complete search history.

(56) References Cited

U.S. PATENT DOCUMENTS

| 4,885,685 | A | * | 12/1989 | Wolfberg et al. | ............ 364/401 |
| 5,206,488 | A | * | 4/1993 | Teicher | ........................ 235/380 |
| 5,724,523 | A | * | 3/1998 | Longfeild | .................... 395/235 |
| 5,878,337 | A | * | 3/1999 | Joao et al. | .................. 455/406 |
| 6,315,196 | B1 | * | 11/2001 | Bachman | ..................... 235/380 |
| 6,339,766 | B1 | * | 1/2002 | Gephart | ........................ 705/44 |

* cited by examiner

*Primary Examiner*—Vincent Millin
*Assistant Examiner*—Daniel Felten
(74) *Attorney, Agent, or Firm*—Baker & McKenzie LLP

(57) ABSTRACT

Method for managing a closing of an account of a user. The method includes receiving an identifier of the account of the user, retrieving status information associated with the identifier and determining whether the account is coded to close from the retrieved status information. Thereafter, automatically providing from the retrieved status information a reason why the account has not been closed if the account is determined to be coded to close.

6 Claims, 3 Drawing Sheets

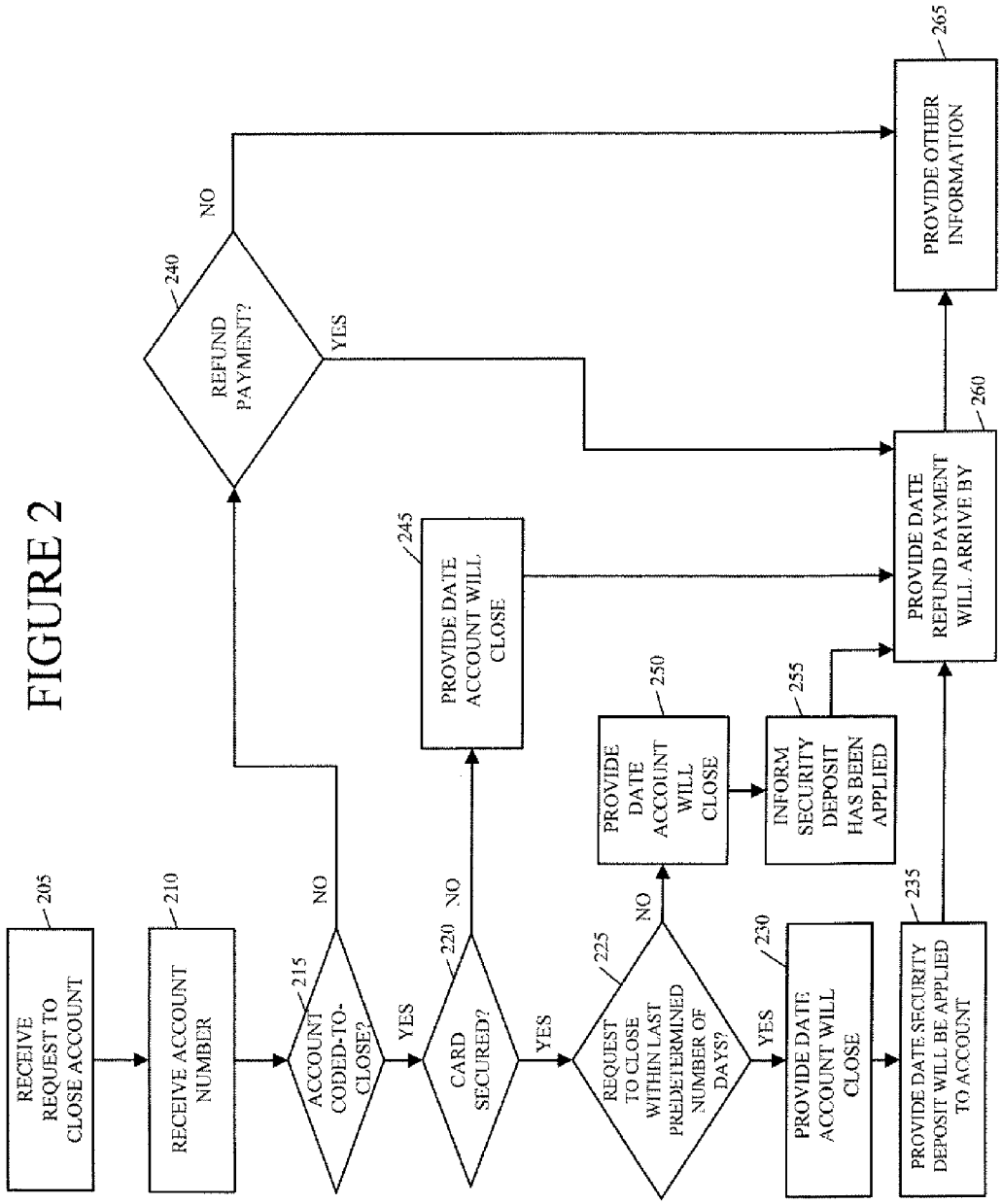

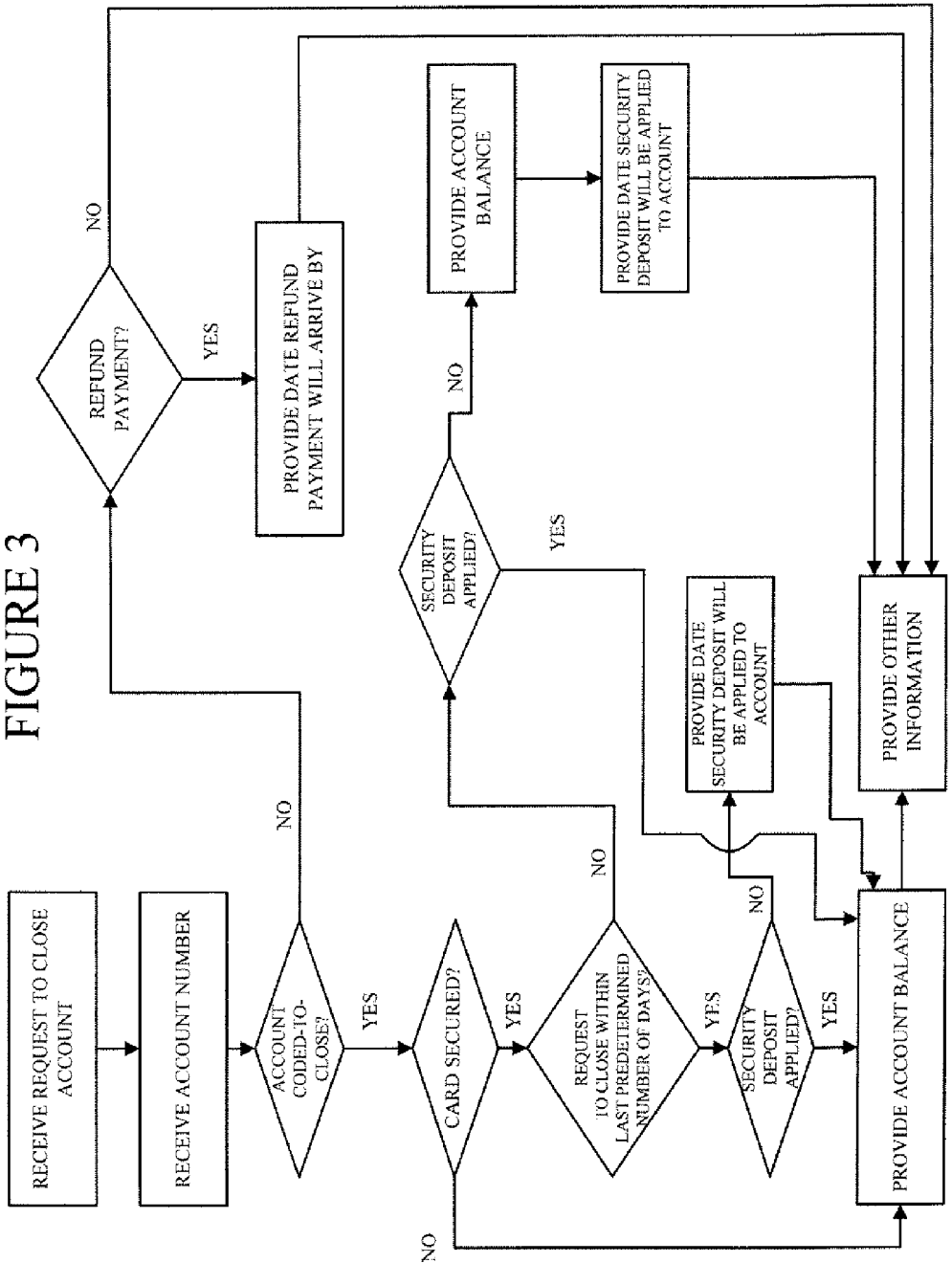

ACCOUNT STATUS SYSTEM AND METHOD FOR MANAGING A CLOSING OF A USER ACCOUNT

FIELD

The present application relates to an account management system and method and, more particularly, to a system and method that provides users via automated messages information about the status of their accounts.

BACKGROUND

Voice response units are used in a variety of applications today to resolve customer problems and questions in conjunction with customer service representatives. In a financial service industry, such voice response units often provide users general information via one or more automated messages. Usually, the user is also given the option to either bypass an automated message or after the automated message has concluded to interact with a customer service representative in order to receive more detailed information tailored to an account of the user.

For example, a user may request to close an account, for example, with a credit card company. Thereafter, the user may contact the credit card company to confirm that an account is closed or when an account will close if the account has not been closed. The user receives very little information, if any, from automated messages, but rather must speak with a customer service representative to receive information about the status of the account that was previously requested to be closed. As a result, since such users would rather speak with a customer service representative because the information provided via automated messages is not sufficient and/or because of lack of patience navigating through several automated messages to find out the necessary information, there is an overload of calls that must be serviced by customer service representatives. Consequently, companies, such as credit card companies, incur tremendous expenses in having to handle these calls with customer service representatives, as opposed to having the calls handled solely through the voice response unit. For example, millions of customer service calls a year are to inquire about an account previously requested to be closed and it cost companies millions of dollars to handle these calls. Specifically, many of these calls will be to confirm that an account is closed, identify when an account will close if the account is not closed already, check the status of a refund check and/or to inquire about automatic charges posting to an account.

Accordingly, a need exist for an automated system and method whereby the number of calls to customer service representatives are mitigated due to detailed information being provided to a user via automated messages regarding the status of an account that was requested to be closed by the user. More particularly, there is a need for an automated system and method that automatically identifies that a user is calling about an account that was requested to be closed and for providing to that user via automated messages account status information tailored to the closing account.

SUMMARY OF THE INVENTION

An aspect of the present application provides for a method for managing a closing of an account of a user. The method includes receiving an identifier of the account of the user, retrieving status information associated with the identifier, determining from the retrieved status information whether the account is coded to close, and automatically providing from the retrieved status information a reason why the account has not been closed if the account is determined to be coded to close.

Another aspect of the present application provides for an account management system for managing a closing of an account of a user, including a memory unit for storing status information of the account, a response unit connected to the memory unit and operable to receive an identifier of the account, and a determination unit connected to the response unit and operable to receive the identifier from the response unit and to retrieve the status information associated with the identifier from the memory unit, the determination unit further operable to determine whether the account is coded to close from the retrieved status information, and to automatically provide through the response unit a message indicating a reason why the account has not been closed if the account is determined to be coded to close.

A further aspect of the present application provides for a method for informing a user of a status of an account. The method includes receiving from the user an account identifier, retrieving status information associated with a closing of the account according to the received account identifier, determining from the retrieved status information whether the account has been closed, and if the account has not been closed, whether a refund is owed to the user on the account and whether a security deposit will be or was applied to the account, determining a date the account will close if it was determined that the account is not closed, determining a date the user will receive the refund if it was determined that the refund is owed to the user, determining a date the security deposit will be applied to the account if it was determined that the security deposit was not applied to the account, and automatically providing to the user from the retrieved status information a voice message indicating at least one of the date the account will close, the date the user will receive the refund and the date the security deposit will be applied to the account.

BRIEF DESCRIPTION OF THE DRAWINGS

FIG. 2 illustrates an exemplary flow diagram when an account balance is less than or equal to zero dollars and a user has requested that the account be closed; and FIG. 3 illustrates an exemplary flow diagram when an account balance is greater than zero dollars and a user has requested that the account be closed.

DETAILED DESCRIPTION

Figure 1:
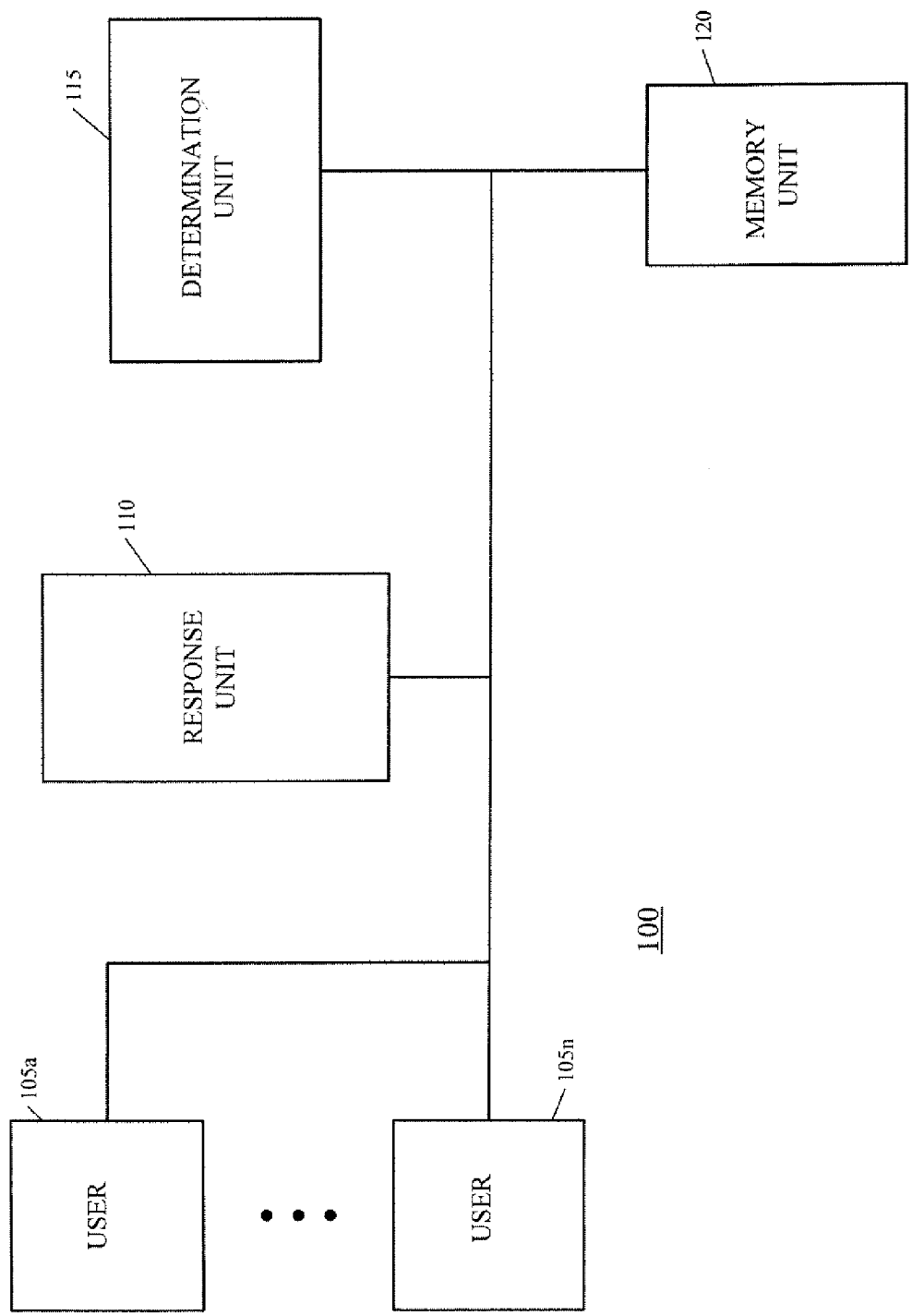
FIG. 1 illustrates an exemplary embodiment of an automated account status system of the present application.

The exemplary embodiments of the present application are explained with reference to a user requesting to close a credit card account and thereafter contacting the credit card company for information regarding the account requested to be closed. The present application, however, is not limited to credit card accounts and credit card companies, rather, other accounts managed or owned by various companies can be requested to be closed by a user.

In FIG. 1, an exemplary automated account status system 100 is shown. Account status system 100 includes one or more users 105a . . . 105n coupled to response unit 110 and determination unit 115 coupled to one or more memory units 120 and to response unit 110. In an exemplary embodiment, users 105a . . . 105n are individuals using communication devices, such as a wired or wireless telephones and/or network connections, for example, Internet connections, via a wireless or wired transmission link to transmit information to and to receive information from response unit 110. Other communication devices can be used by users 105a . . . 105n as well. Further, memory unit 120 can include various types of memory storage devices, for example, one or more databases. Memory unit 120 can store, for example, status information related to accounts. The components of FIG. 1 may be implemented through hardware, software, and/or firmware. The number of components in account status system 100 is not limited to what is illustrated.

FIGS. 2 and 3 illustrate exemplary flow diagrams whereby status information is provided to a user via one or more automated messages after the user has requested that a credit card account be closed. Specifically, FIG. 2 sets forth an exemplary flow diagram when a balance of a credit card account is less than or equal to zero dollars and FIG. 3 sets forth an exemplary flow diagram when a balance of a credit card account is greater than zero.

A user, such as one of users 105a . . . 105n shown in FIG. 1, first requests to close a credit card account, for example, by telephoning a credit card company and verbally informing a customer service representative from the credit card company or sending a request to close via mail or via e-mail to the credit card company. Response unit 110 receives information, for example, from a customer service representative, indicating that the user has requested to close the account and stores the information in memory unit 120, in 205, as shown in FIG. 2.

Thereafter, the user again contacts the credit card company, for example, by telephoning the credit card company via a 1(800) number, and inputs an identifier, such as an account number, associated with the account, for example, using a telephone key pad in order to inquire about the status of the previous request to close the account. Specifically, the user may desire status information regarding whether the account has already been closed, if the account has not been closed, what is the reason or reasons for the account not being closed and how does the user rectify the reason(s), and/or whether a refund check was or will be sent to the user. In an exemplary embodiment, the status information is provided to the user via response unit 110 using one or more automated messages. The automated messages can be voice messages and/or text messages.

Response unit 110 receives information including the account number input by the user, in 210. Determination unit 115 coupled to response unit 110 then determines whether the account is coded to close or has already been closed based on at least the inputted account number associated with the account and information stored in memory unit 120, in 215. In the present application, an account being coded to close means that an account is pending a closing date after receiving a request to close the account. For example, an account can be pending a closing date because an outstanding balance of the account must be paid and/or a confirmation is needed that no additional charges are being put on the account. If determination unit 115 determines that the account has been closed, in 215, another determination is made by determination unit 115 whether a refund payment is to be sent to the user, in 240. If a refund payment is to be sent to the user, response unit 110 provides status information to the user via one or more automated messages including information indicating that the account has been closed, the date the user should receive the refund payment by and/or the amount of the refund payment, in 260. In an exemplary embodiment, the date is calculated by determination unit 115 by adding a predetermined number of days, for example, thirty days, to the date the account was coded to close by the credit card company and the account had a balance of zero dollars. The date can be calculated in variety of ways as well. Further, other information can be provided to the user via one or more automated messages, such as an option to reopen an account, access status information about another account, balance and payment information, payment address information, recent transaction information, available credit information, statement request information, information about lost/stolen credit cards, payment options information, earned interest information and/or deposit information, in 265. In the exemplary embodiments of the present application, a user can choose which if any of the information the user wants to hear about, for example, by pressing an appropriate key on a telephone key pad. If a refund payment is not due, in 240, response unit 110 provides status information to the user via one or more automated messages including an automated message indicating that the account is closed and other information as described above, in 265.

If determination unit 115 determines that the account has been coded to close, but the account has not yet been closed, in 215, determination unit 115 next determines whether the credit card associated with the account is a secured credit card or an unsecured credit card, in 220. For example, a credit card may have been secured by the user having paid a predetermined amount of money, referred to herein as a security deposit, to the credit card company before the credit card was activated by the credit card company. If the credit card is determined to be unsecured after accessing information stored in memory unit 120, in 220, status information is provided to the user via one or more automated messages. In an exemplary embodiment, the status information includes that the account has been coded to be closed and/or information about the reason(s) why the account is not yet closed and what needs to be done or happen for the account to close. For example, an automated message can inform the user that if the account remains at a zero dollar balance, the account will close automatically on a particular date, in 245. The date is calculated by determination unit 115 from the request to close date. Specifically, the date is the date the account was requested to be closed plus a predetermined number of days, for example, thirty days. The date can be calculated in any number of ways and the above calculation is merely exemplary. Further, in 260, if a refund payment is due, response unit 110 provides status information to the user via one or more automated messages including the date the user should receive the refund payment by and/or the amount of the refund payment. In an exemplary embodiment, the date is calculated by determination unit 115 by adding a predetermined number of days to the date the account was coded to close by the credit card company and the account had a balance of zero dollars. The date can be calculated in variety of other ways as well. Further, other information can be provided to the user via one or more automated messages as described above, in 265.

If the credit card associated with the inputted account number is determined to be secured by determination unit 115 after accessing information stored in memory unit 120, in 220, determination unit 115 then determines whether the request to close the account was within the last predetermined number of days, in 225. For example, a determination is made whether the request to close the account was made within the last ten days preceding the current account status inquiry by the user. If the request to close the account was made within the last predetermined number of days, in 225, status information is provided to the user via one or more automated messages including information indicating that the account has been selected to be closed, the request to close the account was made within the last predetermined number of days and/or that the security deposit has not yet been applied to the account. In addition, the user is informed via an automated message the date the account will automatically close on or by if the account balance remains at zero dollars, in 230. In an exemplary embodiment, the date is calculated by determination unit 115 by adding a predetermined number of days to the date of the request to close the account. The user is also provided via an automated message the date the security deposit will be applied to the account, in 235. For example, the date is calculated by determination unit 115 by adding a predetermined number of days to the date of the request to close the account. In an exemplary embodiment, a security deposit is applied to an account by using some or all of the security deposit to pay off some or all of an outstanding balance of the account.

Further, in 260, if a refund payment is due, response unit 110 provides status information to the user including the date the user should receive the refund payment by and/or the amount of the refund payment. In an exemplary embodiment, the date is calculated by determination unit 115 by adding a predetermined number of days to the date the account was coded to close by the credit card company and the account had a balance of zero dollars. Further, other information can be provided to the user via one or more automated messages as described above, in 265.

If the request to close the account was not made within the last predetermined number of days, in 225, status information is provided to the user via one or more automated messages including information indicating that the account has been coded to be closed and/or that the request to close the account was not made within the last predetermined number of days. In addition, the user is informed via an automated message the date the account will automatically close if the account balance remains at zero dollars, in 250. In an exemplary embodiment, the date is calculated by determination unit 115 by adding a predetermined number of days to the date of the request to close the account. The user is also informed that the security deposit has been applied to the balance of the account, in 255. Further, in 260, if a refund payment is due, response unit 110 provides status information to the user including the date the user should receive the refund payment by and/or the amount of the refund payment. In an exemplary embodiment, the date is calculated by determination unit 115 by adding a predetermined number of days to the date the account was coded to close by the credit card company and the account had a balance of zero dollars. Further, other information can be provided to the user via one or more automated messages as described above, in 265.

FIG. 3 sets forth an exemplary flow diagram when a balance of a credit card account is greater than zero and a user has requested that the account be closed.

A user, such as one of users 105a . . . 105n shown in FIG. 1, first requests to close a credit card account, for example, by telephoning a credit card company and verbally informing a customer service representative from the credit card company or sending a request to close via mail or via e-mail to the credit card company. Response unit 110 receives information, for example, from a customer service representative, indicating that the user has requested to close the account and stores the information in memory unit 120, in 305, as shown in FIG. 3.

Thereafter, the user again contacts the credit card company, for example, by telephoning the credit card company via a 1(800) number, and inputs an account number associated with the account, for example, using a telephone key pad in order to inquire about the status of the previous request to close the account. Specifically, the user may desire status information regarding whether the account has already been closed, if the account has not been closed, what is the reason or reasons for the account not being closed and how does the user rectify the reason(s), and/or whether a refund check was or will be sent to the user. In an exemplary embodiment, the status information is provided to the user via response unit 110 using one or more automated messages.

Response unit 110 receives information including the account number input by the user, in 310. Determination unit 115 coupled to response unit 110 then determines whether the account is coded to close or has already been closed based on at least the inputted account number associated with the account and information stored in memory unit 120, in 315. If determination unit 115 determines that the account has been closed, in 315, another determination is made by determination unit 115 whether a refund payment should be sent to the user, in 340. If a refund payment should be sent to the user, response unit 110 provides status information to the user via one or more automated messages including information indicating that the account has been closed, the date the user should receive the refund payment by and/or the amount of the refund payment, in 345. In an exemplary embodiment, the date is calculated by determination unit 115 by adding a predetermined number of days, for example, thirty days, to the date the account was coded to close by the credit card company and the account had a balance of zero dollars. The date can be calculated in variety of ways as well. Further, other information can be provided to the user via one or more automated messages as described above with reference to 265 of FIG. 2, in 360. If a refund payment is not due, in 340, response unit 110 provides status information to the user via one or more automated messages including that the account is closed and other information as described above, in 360.

If determination unit 115 determines that the account has not yet been closed, rather the account has been coded to close, in 315, determination unit 115 next determines whether the credit card associated with the account is a secured credit card or an unsecured credit card, in 320. If the credit card is determined to be unsecured, in 320, status information is provided to the user via one or more automated messages. In an exemplary embodiment, the status information includes that the account has been coded to be closed and/or information about the reason(s) why the account is not yet closed and what needs to be done or happen for the account to close. For example, an automated message can inform the user that in order for the account to close, the account needs to reach a zero dollar balance and complete a monthly billing cycle. Response unit 110 provides to the user via one or more automated messages the account balance and additional information regarding the paying down of the account balance, in 335. Further, other information can be provided to the user via one or more automated messages as described above, in 360.

If the credit card associated with the inputted account number is determined to be secured by determination unit 115 after accessing information stored in memory unit 120, in 320, determination unit 115 then determines whether the request to close the account was within the last predetermined number of days, in 325. For example, a determination is made whether the request to close the account was made within the last thirty days preceding the current account status inquiry by the user. If the request to close the account was made within the last predetermined number of days, in 325, determination unit 115 then determines whether a security has been applied to the account, in 330. In an exemplary embodiment, determination unit 115 also determines whether a security deposit should be applied to an account and if so, determination unit 115 applies the security deposit to the account.

If a security deposit is determined to have been applied to the account, in 330, status information is provided to the user via one or more automated messages including that the account has been selected to be closed, information about the reason(s) why the account is not yet closed and what needs to be done or happen for the account to close, and/or that the security deposit has been applied to the account. For example, an automated message can inform the user that in order for the account to close, the account needs to reach a zero dollar balance and complete a monthly billing cycle. Response unit 110 provides to the user via one or more automated messages the account balance and additional information regarding the paying down of the account balance, in 335. Further, other information can be provided to the user via one or more automated messages as described above, in 360.

If a security deposit is determined to not have been applied to the account, in 330, status information is provided to the user via one or more automated messages including that the account has been selected to be closed, information about the reason(s) why the account is not yet closed and what needs to be done or happen for the account to close, and/or that the security deposit has not yet been applied to the account. For example, an automated message can inform the user that in order for the account to close, the account needs to reach a zero dollar balance and complete a monthly billing cycle. Response unit 110 also provides to the user via one or more automated messages that the security deposit will be applied to the account on a particular date, in 355. In an exemplary embodiment, the particular date is a predetermined number of days after the date of the coded to close request. Moreover, the user is provided via one or more automated messages the account balance and additional information regarding the paying down of the account balance, in 335. Further, other information can be provided to the user via one or more automated messages as described above, in 360.

If determination unit 115 determines that the request to close the account was not made within the last predetermined number of days, in 325, determination unit 115 then determines whether a security has been applied to the account, in 350.

If a security deposit is determined to have been applied to the account, in 350, status information is provided to the user via one or more automated messages including that the account has been selected to be closed, information about the reason(s) why the account is not yet closed and what needs to be done or happen for the account to close, and/or that the security deposit has been applied to the account. For example, an automated message can inform the user that in order for the account to close, the account needs to reach a zero dollar balance and complete a monthly billing cycle. Response unit 110 provides to the user via one or more automated messages the account balance and additional information regarding the paying down of the account balance, in 335. Further, other information can be provided to the user via one or more automated messages as described above, in 360.

If a security deposit is determined to not have been applied to the account, in 350, status information is provided to the user via one or more automated messages including that the account has been selected to be closed, information about the reason(s) why the account is not yet closed and what needs to be done or happen for the account to close, and/or that the security deposit has not yet been applied to the account. For example, an automated message can inform the user that in order for the account to close, the account needs to reach a zero dollar balance and complete a monthly billing cycle. The user is provided via one or more automated messages the account balance and additional information regarding the paying down of the account balance, in 365. Response unit 110 also provides to the user via an automated message that the security deposit will be applied to the account on a particular date, in 370. In an exemplary embodiment, the particular date is a predetermined number of days after the date of the coded to close request. Further, other information can be provided to the user via one or more automated messages as described above, in 360.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An account management system for managing a closing of an account of a user, comprising:
    a memory unit for storing status information of the account;
    a response unit connected to the memory unit and operable to receive an identifier of the account; and
    a determination unit connected to the response unit and operable to receive the identifier from the response unit and to retrieve the status information associated with the identifier from the memory unit, the determination unit further operable
    to determine whether the account is coded to close from the retrieved status information, and
    to automatically provide through the response unit a message indicating a reason why the account has not been closed if the account is determined to be coded to close.

2. The account management system for managing a closing of an account of a user as set forth in claim 1, wherein
    the message is a voice message.

3. The account management system for managing a closing of an account of a user as set forth in claim 1, wherein
    the message is a text message.

4. The account management system for managing a closing of an account of a user as set forth in claim 1, wherein
    the account is a credit card account.

5. The account management system for managing a closing of an account of a user as set forth in claim 1, wherein
    the identifier is a predetermined account number.

6. The account management system for managing a closing of an account of a user as set forth in claim 1, wherein
    the reason the account has not been closed includes at least one of that the account has an outstanding balance and that a predetermined number of days have not expired from a request to close date to a date of receipt of the identifier.

* * * * *